J. H. RAE.
MODE OF COLLECTING GOLD AND SILVER FROM SWEEPINGS,
WASHINGS, &c.
No. 62,776.  Patented Mar. 12, 1867.
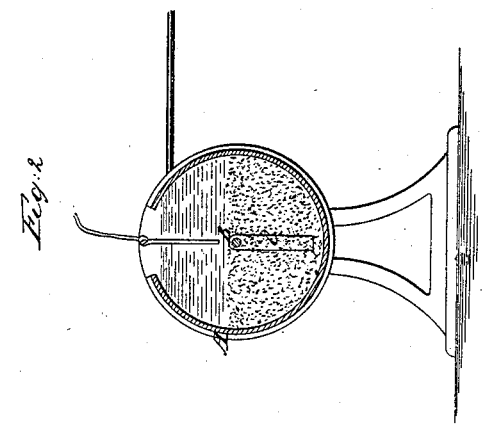
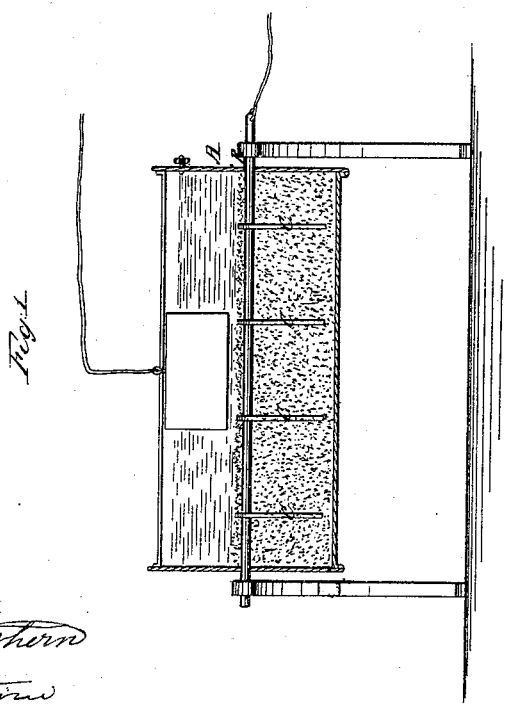
Witnesses  Inventor

United States Patent Office.

JULIO H. RAE, M. D., OF SYRACUSE, NEW YORK.

Letters Patent No. 62,776, dated March 12, 1867.

---

IMPROVED MODE OF COLLECTING GOLD AND SILVER FROM SWEEPINGS, WASHINGS, &c.

---

The Schedule referred to in these Letters Patent and making part of the same.

---

TO ALL WHOM IT MAY CONCERN:

Be it known that I, JULIO H. RAE, M. D., of Syracuse, in the county of Onondaga, and State of New York, have invented a new and improved Mode of Treating Sweepings, Filings, and Washings containing Gold or Silver; and I do hereby declare that the following is a full, clear, and exact description thereof, which will enable those skilled in the art to make and use the same, reference being had to the accompanying drawing, forming part of this specification, in which—

Figure 1 represents a longitudinal central section of the apparatus which may be used in carrying out this invention.

Figure 2 is a transverse section thereof.

Similar letters of reference in both views indicate corresponding parts.

This invention consists in treating sweepings, filings, and washings containing gold or silver with a current of electricity or galvanism for the purpose of separating the precious metals from the impurities of foreign matter mixed with them. In connection with the electric current suitable liquids or chemical preparations, such, for instance, as cyanide of potassium, are used in such a manner that by the combined action of the electricity and chemicals the precious metals contained in the sweepings, filings, and washings are first reduced to a state of solution, and afterwards collected and deposited either as oxides or in a metallic state, and the operation of extracting or separating said precious metals from the sweepings, filings, or washings, is attended with very little trouble and expense. During this operation the bath which contains the washings, filings, or sweepings, acts as an electrode and also as an agitator. The apparatus which I use in carrying out my invention is constructed as follows:

A represents a bath, which is made of carbon, or of wood or metal lined with carbon, or of any other suitable good conductor of electricity in any suitable form or shape. This bath is mounted on a shaft, B, which has its bearings in suitable standards, so that an oscillating or rocking motion can be imparted to said bath by hand or by any suitable motive power. The shaft B is made of platina or any other suitable material capable of resisting the action of the chemicals employed during the process, and it is provided with a series of fingers, C, which extend near to the inner surface of the bath, as clearly shown in the drawing. Said fingers are made of platina or any other suitable material, and they may be made in any desirable form or shape, and applied in any number or position which may be found to be of advantage. When the apparatus is to be used for separating gold or silver from sweepings, filings, or washings, the bath A is filled up about as high as the shaft with the sweepings or other material, and upon this is poured the proper solution, say cyanide of potassium for gold, until the fluid rises several inches (more or less) above the shaft, according to the size of the bath. The positive pole of the battery is then connected with the bath or shaft, or with both, thus converting the bath, fingers, and shaft, into an electrode, and from a wire which connects with the negative pole of the battery is suspended a base-plate of platina, or any other suitable material, so that the same is immersed in the fluid contained in the bath, and by imparting to the bath an oscillating or rocking motion, the fingers connected to the shaft are made to sweep through the material from which the precious metal is to be extracted, and every particle of gold or silver contained in the mass will be taken up and held in solution. By the action of the electric current, combined with the chemicals, the gold or silver contained in the bath is rapidly deposited on the base in a metallic state, or in the state of an oxide, and the operation of extracting gold or silver from sweepings, filings, or washings obtained in jewellers' shops, photographic galleries, and other places, is conducted in an economical and expeditious manner. If desired, the edges of the bath may be protected by some insulating material, such as glass or gutta percha, whereby any interruption of the electric current will be prevented if these edges should come in contact with the negative wire.

What I claim as new, and desire to secure by Letters Patent, is—

1. The within-described process of treating sweepings, filings, or washings containing gold or silver by exposing the same to the combined action of a current of electricity, and of suitable solvents or chemicals, substantially such as herein specified, or any others which will produce the same effect.

2. Separating gold or silver from washings, filings, or sweepings containing said metals, by the action or aid of electricity, substantially as described.

3. Using the bath A as an electrode and as an agitator, substantially as and for the purpose set forth.

JULIO H. RAE.

Witnesses:
    D. B. CHILDS,
    GEO. F. SOUTHERN.